United States Patent
Szczepanski (10) Patent No.: US 9,417,140 B2
(45) Date of Patent: Aug. 16, 2016

(54) EXHAUST GAS TEMPERATURE SENSOR WITH ANTI-RESONANCE CONICAL SHAFT FEATURE

(71) Applicant: DENSO International America, Inc., Southfield, MI (US)

(72) Inventor: Edward Szczepanski, Grosse Pointe Woods, MI (US)

(73) Assignee: Denso International America, Inc., Southfield, MI (US)

( * ) Notice: Subject to any disclaimer, the term of this patent is extended or adjusted under 35 U.S.C. 154(b) by 310 days.

(21) Appl. No.: 14/016,772

(22) Filed: Sep. 3, 2013

(65) Prior Publication Data

US 2015/0063416 A1    Mar. 5, 2015

(51) Int. Cl.
| | |
|---|---|
| G01K 1/08 | (2006.01) |
| G01K 1/14 | (2006.01) |
| G01K 13/00 | (2006.01) |
| G01K 13/02 | (2006.01) |

(52) U.S. Cl.
CPC .......... G01K 13/02 (2013.01); *G01K 2013/024* (2013.01); *G01K 2205/04* (2013.01)

(58) Field of Classification Search
CPC .............. G01K 13/00; G01K 2205/04; G01K 2013/04; G01K 13/02
USPC ........................................................ 73/866.5
See application file for complete search history.

(56) References Cited

U.S. PATENT DOCUMENTS

| | | | | |
|---|---|---|---|---|
| 2,973,495 | A * | 2/1961 | Greenberg | G01K 1/08 338/28 |
| 4,865,462 | A | 9/1989 | Broomfield | |
| 5,749,656 | A | 5/1998 | Boehm et al. | |
| 8,425,114 | B2 | 4/2013 | Hori et al. | |
| 2007/0171959 | A1 * | 7/2007 | Irrgang | G01K 1/10 374/185 |
| 2009/0323765 | A1 * | 12/2009 | Yokoi | G01K 7/22 374/185 |
| 2012/0294331 | A1 * | 11/2012 | Mogari | G01K 1/14 374/144 |

FOREIGN PATENT DOCUMENTS

| | | |
|---|---|---|
| DE | 29823379 | 8/1999 |
| DE | 102004018354 | 11/2005 |
| DE | 102008029227 | 12/2009 |
| DE | 202011001278 | 6/2012 |
| JP | 2008286789 | 11/2008 |

OTHER PUBLICATIONS

EXACTSENSE® Thermocouple, © 2012 Watlow Electric Manufacturing Company, RIC-ESTC-0812.

* cited by examiner

*Primary Examiner* — Lisa Caputo
*Assistant Examiner* — Janice M Soto
(74) *Attorney, Agent, or Firm* — Harness, Dickey & Pierce, P.L.C.

(57) ABSTRACT

A sensor assembly including a sensing element, a conductor connected to the sensing element, and an elongated shaft. The elongated shaft includes a proximal end and a distal end. An inner surface of the shaft defines a through-bore extending from the proximal end to the distal end. The through-bore is configured to receive the conductor therethrough. An outer surface of the shaft includes a proximal diameter at the proximal end and a distal diameter at the distal end. The proximal diameter is greater than the distal diameter and configured to dampen vibration.

20 Claims, 5 Drawing Sheets

EXHAUST GAS TEMPERATURE SENSOR WITH ANTI-RESONANCE CONICAL SHAFT FEATURE

FIELD

The present disclosure relates to an exhaust gas temperature sensor with an anti-resonance conical shaft feature.

BACKGROUND

This section provides background information related to the present disclosure, which is not necessarily prior art.

Motor vehicles often include an exhaust gas temperature sensor for measuring the temperature of an exhaust gas stream emitted from the vehicle. The sensor often includes a temperature sensing element mounted at a distal end of an elongated shaft of the sensor. The elongated shaft supports the sensing element in the exhaust gas stream in order to sense the temperature thereof. The further the sensing element is positioned into the exhaust gas stream, generally the more accurate the temperature reading will be. It is thus advantageous to have a shaft with an extended length in order to position the sensing element as far into the exhaust gas stream as possible. However, shafts having an extended length are often subject to excessive vibrations transferred thereto from the engine. For example, a typical vehicle engine may vibrate at between 250 Hz and 400 Hz. An elongated sensor shaft of 80 millimeters having a uniform outer diameter of 3 millimeters will often begin to vibrate at about 393 Hz, and will thus experience excessive vibration during normal engine operation, which may lead to temperature readings of decreased accuracy and/or damage to the sensor. An exhaust gas temperature sensor having an elongated shaft for supporting a temperature sensing element in an exhaust gas stream that is not subject to extensive vibration during standard operation of a typical engine or motor would thus be desirable.

SUMMARY

This section provides a general summary of the disclosure, and is not a comprehensive disclosure of its full scope or all of its features.

The present teachings provide for a sensor assembly including a sensing element, a conductor connected to the sensing element, and an elongated shaft. The elongated shaft includes a proximal end and a distal end. An inner surface of the shaft defines a through-bore extending from the proximal end to the distal end. The through-bore is configured to receive the conductor therethrough. An outer surface of the shaft includes a proximal diameter at the proximal end and a distal diameter at the distal end. The proximal diameter is greater than the distal diameter and configured to dampen vibration.

The present teachings further provide for a sensor assembly including a sensing element, a conductor connected to the sensing element. The elongated shaft includes a proximal end, a distal end, an inner surface, and an outer surface. The inner surface defines a through-bore extending from the proximal end to the distal end. The through-bore is configured to receive the conductor therethrough. The outer surface includes a proximal diameter at the proximal end and a distal diameter at the distal end. The proximal diameter is greater than the distal diameter and is configured to dampen vibration. The sensing element is configured to sense properties of a gas.

The present teachings also provide for a sensor assembly including a temperature sensing element, a conductor, and an elongated shaft. The temperature sensing element includes an exhaust gas temperature sensing thermistor. The elongated shaft includes a proximal end, a distal end, an inner surface, and an outer surface. The inner surface defines a through-bore extending from the proximal end to the distal end. The through-bore is configured to receive the conductor therethrough. The outer surface includes a proximal diameter at the proximal end and a distal diameter at the distal end. The outer surface tapers inward along a length thereof between the proximal end and the distal end. The proximal diameter is greater than the distal diameter to dampen vibration. The conductor is configured to support the thermistor spaced apart from the elongated shaft at the distal end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
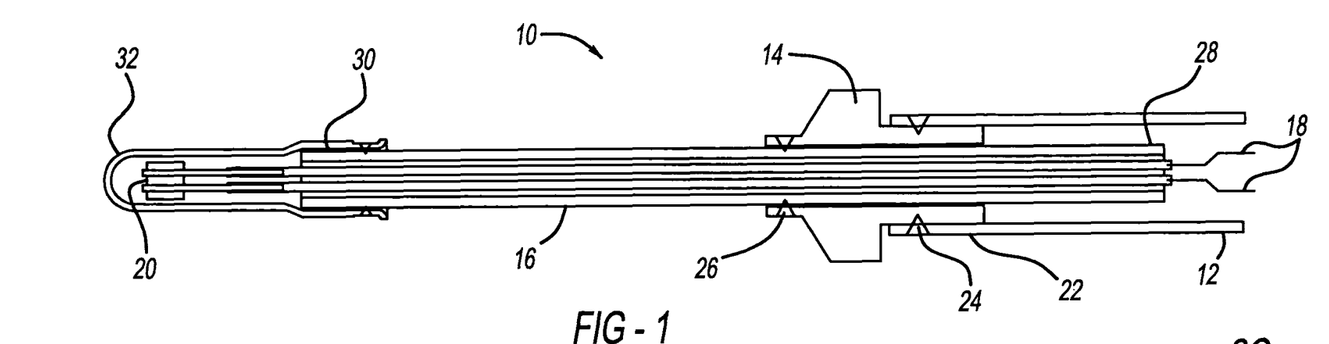
FIG. 1 is a cross-sectional view of an exhaust gas temperature sensor assembly according to the present teachings.

With initial reference to FIG. 1, a sensor assembly according to the present teachings is generally illustrated at reference numeral 10. The sensor assembly 10 can be configured to sense any suitable parameter in any suitable application. For example, the sensor assembly 10 can be configured to sense one or more of temperature; pressure; constituent components, such as of a gas; chemical composition; etc. The sensor assembly 10 can be any suitable temperature sensor assembly, such as an exhaust gas temperature sensor assembly. For example, the sensor assembly 10 can be a motor vehicle exhaust gas temperature sensor assembly, the motor vehicle being any suitable motor vehicle, such as an automobile, a truck, an aircraft, a military vehicle, or a watercraft, for example. The sensor assembly 10 can also be used in conjunction with an engine not associated with a vehicle, such as a generator, an HVAC system, or any type of machinery or equipment.

In the exemplary illustration of FIG. 1, the sensor assembly 10 includes a housing 12, a coupling member 14, an elongated shaft 16, conductors 18, and a temperature sensing element 20. The housing 12 can be any suitable housing, such as a generally cylindrical housing configured to receive the coupling member 14 and the elongated shaft 16 within a distal end 22 of the housing 12. The housing 12 can include any suitable locking member for securing the coupling member 14 therein, such as housing locking members 24. The housing locking members 24 are generally illustrated as teeth mounted to an interior of the housing 12, which extend inward to grip a portion of the coupling member 14 seated within the housing 12 at the distal end 22 thereof.

The coupling member 14 defines a through-bore through which the elongated shaft 16 extends into the housing 12. The coupling member 14 includes coupling member locking members 26, which secure the elongated shaft 16 to and within the coupling member 14. The locking members 26 can be any suitable locking members or device to secure the elongated shaft 16 to and within the coupling member 14, such as teeth that extend into the through-bore defined by the coupling member 14 as generally illustrated.

The conductors 18 extend through at least a portion of the housing 12 and into the elongated shaft 16 at a proximal end 28 of the elongated shaft 16, which is seated within the housing 12. The conductors 18 extend entirely through the elongated shaft 16, and exit the elongated shaft 16 at a distal end 30 thereof, which is opposite to the proximal end 28. The conductors 18 can be any suitable type of electrical conductor, such as wire leads.

The temperature sensing element 20 is coupled to the conductors 18 at a portion thereof extending beyond the distal end 30. The temperature sensing element 20 can be any suitable element or device suitable for sensing temperature, such as a temperature of exhaust gas emitted from a vehicle engine, such as an internal combustion engine. The temperature sensing element 20 can thus be a thermistor element, for example. The temperature sensing element 20 and portions of the conductors 18 extending from the distal end 30 of the elongated shaft 16 can be covered by a cap 32. The cap 32 can be any suitable cap, such as to protect the temperature sensing element 20 and the conductors 18 proximate thereto. The cap 32 can be secured in any suitable manner, such as with a press fit at the distal end 30 in which the distal end 30 extends within the cap 32.

The elongated shaft 16 can be provided in a variety of different forms and can include a variety of different features in order to dampen vibration thereof, and thus isolate the elongated shaft 16 and the temperature sensing element 20 from vibrations generated by an engine of a vehicle or machine that the sensor assembly 10 is associated with. Various exemplary elongated shafts are illustrated in FIGS. 2A-6, and at reference numbers 16a-16e. The elongated shafts 16a-16e will now be described in detail.

Each one of the elongated shafts 16a-16e generally includes a proximal end 110 and a distal end 112, which is opposite to the proximal end 110. The proximal end 110 corresponds to the proximal end 28 of FIG. 1, and the distal end 112 corresponds to the distal end 30 of FIG. 1. Each one of the elongated shafts 16a-16e can have any suitable length, such as 80 mm or about 80 mm. Each one of the elongated shafts 16a-16e can have any suitable diameter. For example, each one of the elongated shafts 16a-16e can have a maximum outer diameter of 3 mm or about 3 mm at the distal end 112, and a maximum outer diameter of 4.5 mm or about 4.5 mm at the proximal end 110. The elongated shafts 16a-16e can be made of any suitable material, such as stainless steel. Any suitable type of stainless steel can be used, such as SUS 310S including, for example, a density of 8,000 kilograms per meters cubed, a Young's modulus of $2 \times 10^5$ MPa, a Poison's ratio of 0.3, and material damping of 0.5%.

Each one of the elongated shafts 16a-16e also includes an inner surface 114 and an outer surface 116 opposite thereto. The inner surface 114 defines a through-bore 118, which extends from the proximal end 110 to the distal end 112. The through-bore 118 extends along a longitudinal axis A of each one of the elongated shafts 16a-16e. The longitudinal axis A extends along a length of each one of the elongated shafts from the proximal end 110 to the distal end 112. The longitudinal axis A generally extends through an axial center of the through-bore 118.

Figures 2A, 2B:
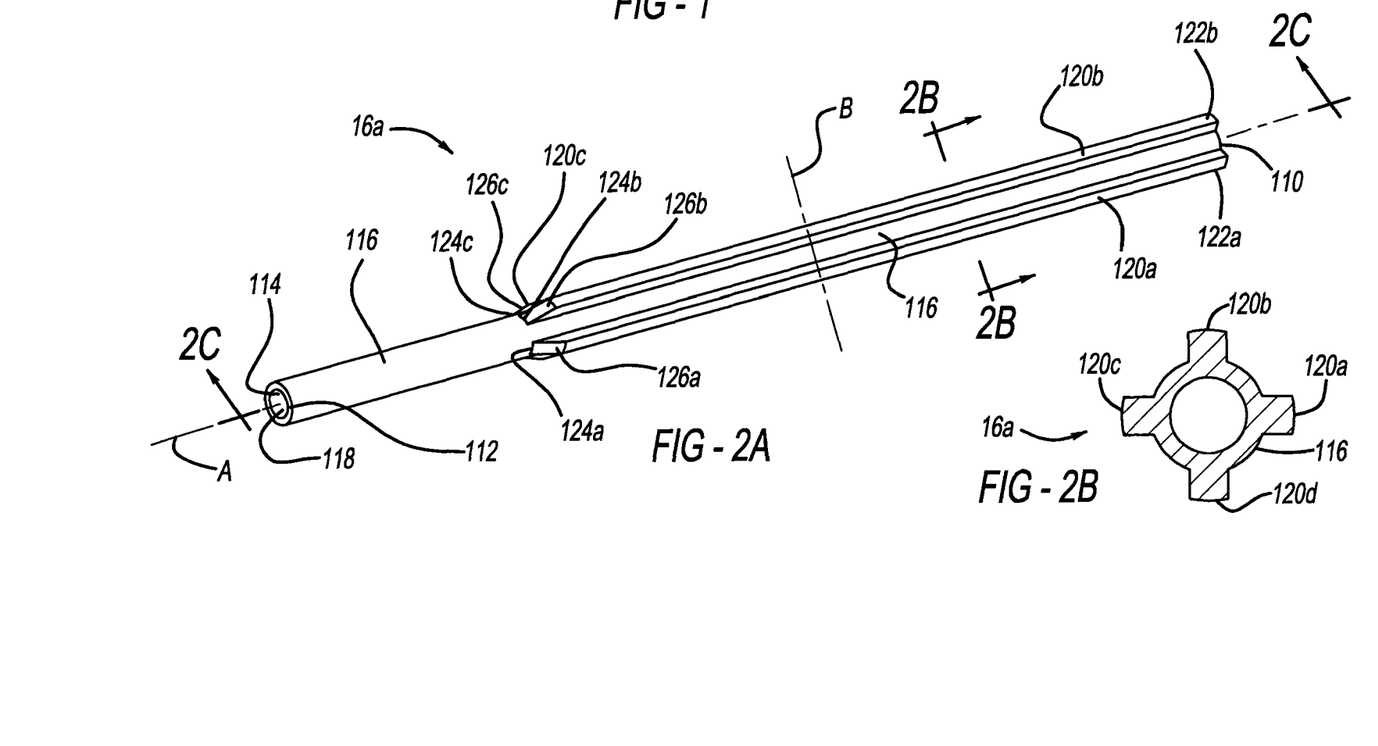
FIG. 2A is a perspective view of an elongated shaft for use with the sensor assembly of FIG. 1.
FIG. 2B is a cross-sectional view taken along line 2B-2B of FIG. 2A.
Figure 2C:
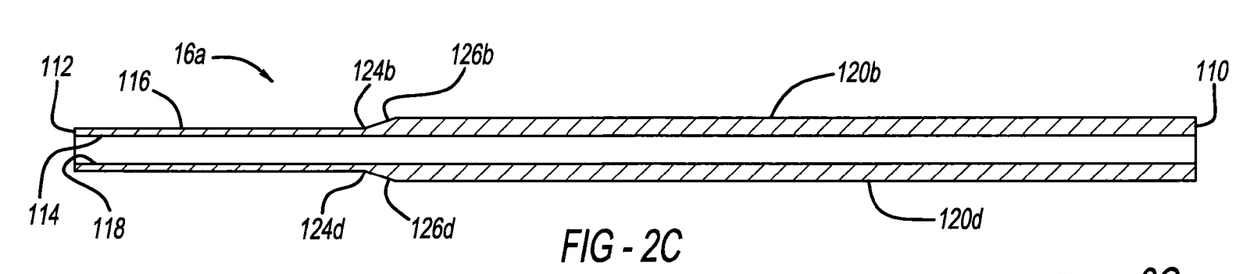
FIG. 2C is a cross-sectional view taken along line 2C-2C of FIG. 2A.
Figures 3A, 3B:
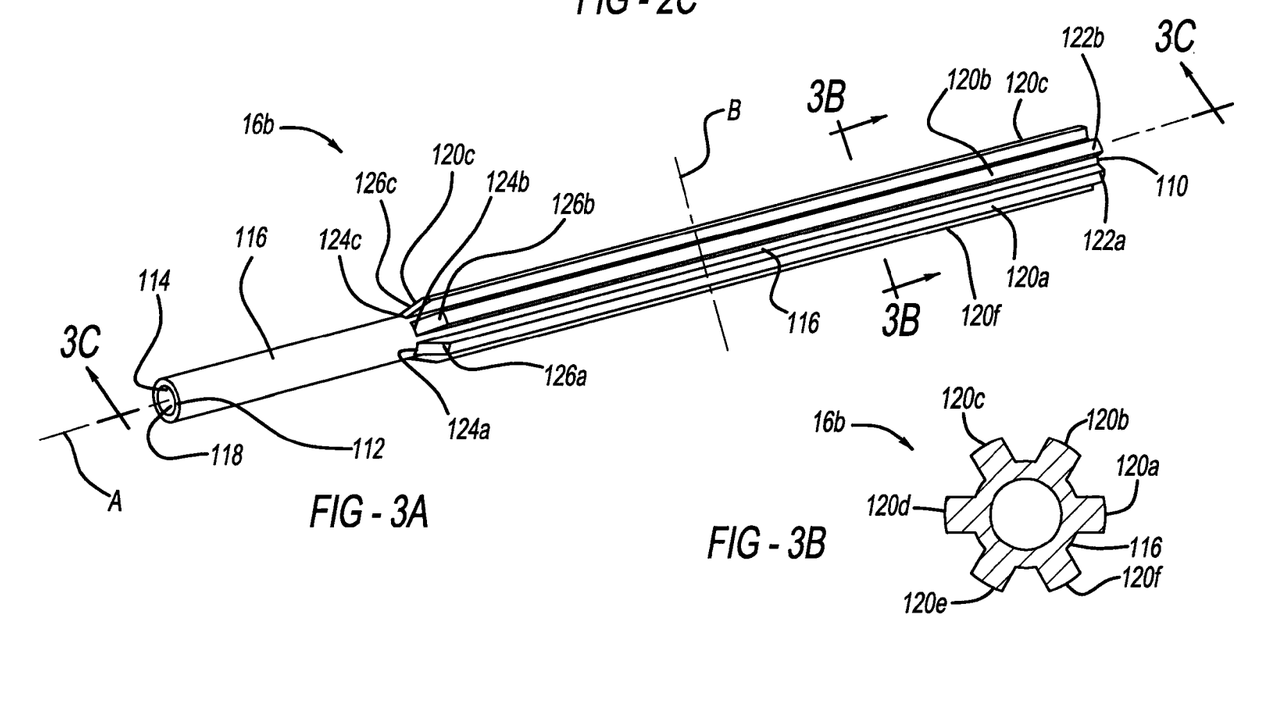
FIG. 3A is a perspective view of another elongated shaft for use with the sensor assembly of FIG. 1.
FIG. 3B is a cross-sectional view taken along line 3B-3B of FIG. 3A.
Figure 3C:
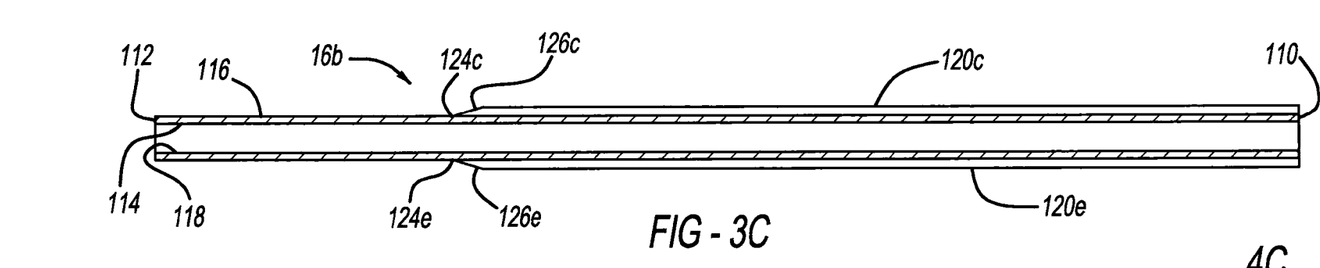
FIG. 3C is a cross-sectional view taken along line 3C-3C of FIG. 3A.

With particular reference to FIGS. 2A-2C, the elongated shaft 16a includes a plurality of vibration dampers, which as illustrated generally take the form of a first rib 120a, a second rib 120b, a third rib 120c, and a fourth rib 120d. All four of the ribs 120a-120d are illustrated in the cross-sectional view of FIG. 2B. Each one of the ribs 120a-120d includes a proximal rib end 122a-122d respectively, and a distal rib end 124a-124d respectively. Each one of the ribs 120a-120d protrude beyond the outer surface 116. Each one of the ribs 120a-120d extend generally parallel to the longitudinal axis A from at or proximate to the proximal end 110 of the elongated shaft 16a towards the distal end 112 thereof.

The ribs 120a-120d can extend parallel to the longitudinal axis A to any suitable position along the length of the elongated shaft 16a, such as to a midpoint B of the elongated shaft 16a, which is equidistant between the proximal end 110 and the distal end 112. The ribs 120a-120d can terminate prior to reaching the midpoint B, such that the distal rib ends 124a-124d are on a proximal side of the midpoint B and thus closer to the proximal end 110 than the distal end 112. The ribs 120a-120d can also extend beyond the midpoint B as illustrated, such that the distal rib ends 124a-124d are closer to the distal end 112 than the proximal end 110. As illustrated, the distal rib ends 124a-124c extend across two-thirds, or approximately two-thirds, of the length of the elongated shaft 16a, as measured from the proximal end 110.

Each of the ribs 120a-120d can include a tapered portion 126a-126d respectively at the distal rib ends 124a-124d thereof. The tapered portions 126a-126d generally provide a transition between the ribs 120a-120d and the outer surface 116 at the distal rib ends 124a-124d. The ribs 120a-120d are spaced apart about the outer surface 116 and the longitudinal axis A. The ribs 120a-120d can be uniformly spaced apart at regular intervals, or can be spaced apart at any other suitable uniform or non-uniform intervals. At the proximal end 110, the elongated shaft 16a can have a maximum outer diameter as measured across opposing ones of the ribs 120, such as first rib 120a and third rib 120c, of 4.5 millimeters, or about 4.5 millimeters. At the distal end 112, the elongated shaft 16a can have a maximum outer diameter as measured across the longitudinal axis A of about 3.0 millimeters. The ribs 120a-120f can be monolithic with the remainder of the elongated shafts 16c or 16d. The ribs 120a-120f can also be integral with the outer surface 116 or can be mounted thereto in any suitable manner, such as with a suitable adhesive or mechanical connection.

Although four ribs 120a-120d are illustrated in FIGS. 2A-2C in conjunction with the description of the elongated shaft 16a, any suitable number of ribs 120 can be provided. For example and with additional reference to FIGS. 3A and 3B, six ribs 120a-120f can be provided. The ribs 120a-120f can be evenly spaced apart about the elongated shaft 16b as illustrated, or can be provided at any suitable regular or irregular interval. Any suitable number of the ribs 120 can be provided in addition to the four ribs 120a-120d of FIGS. 2A and 2B, and the six ribs 120a-120f of FIGS. 3A and 3B. For example, three, five, seven, eight, nine, ten, etc. ribs 120 can be provided.

Figures 4A, 4B:
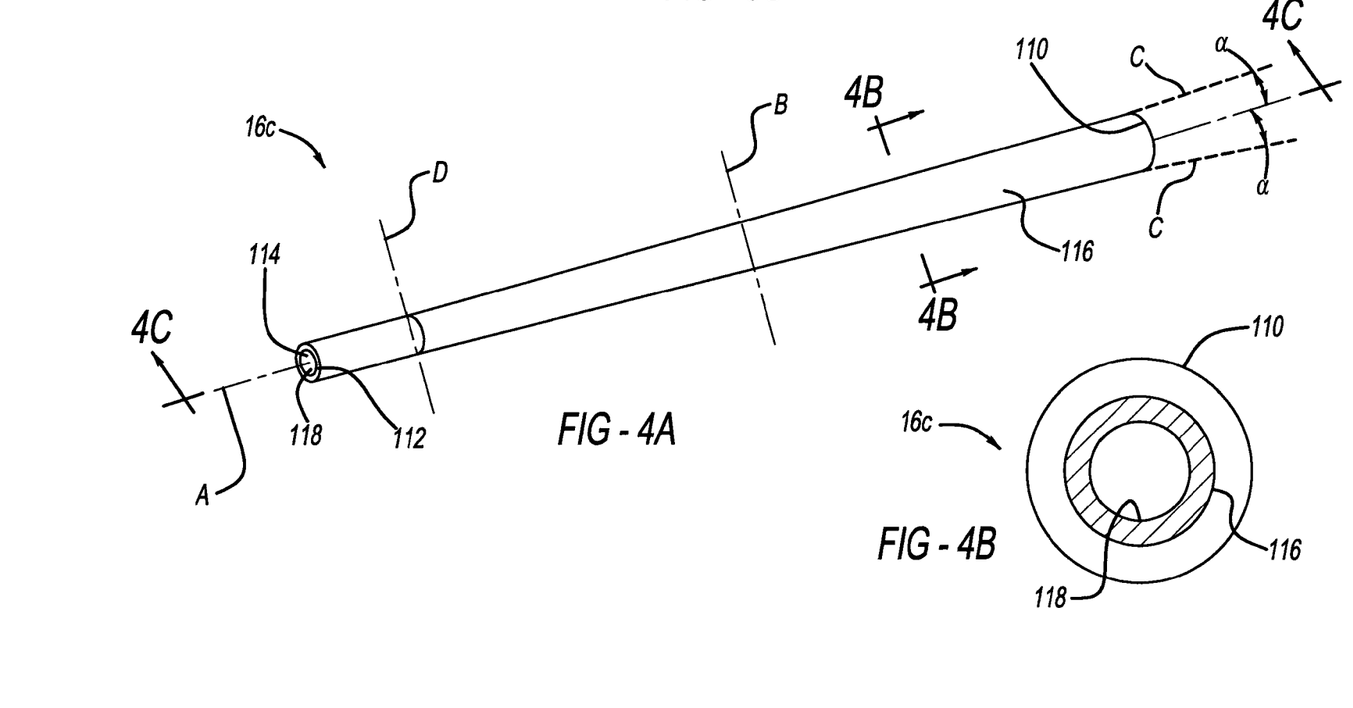
FIG. 4A is a perspective view of an additional elongated shaft for use with the sensor assembly of FIG. 1.
FIG. 4B is a cross-sectional view taken along line 4B-4B of FIG. 4A.
Figure 4C:
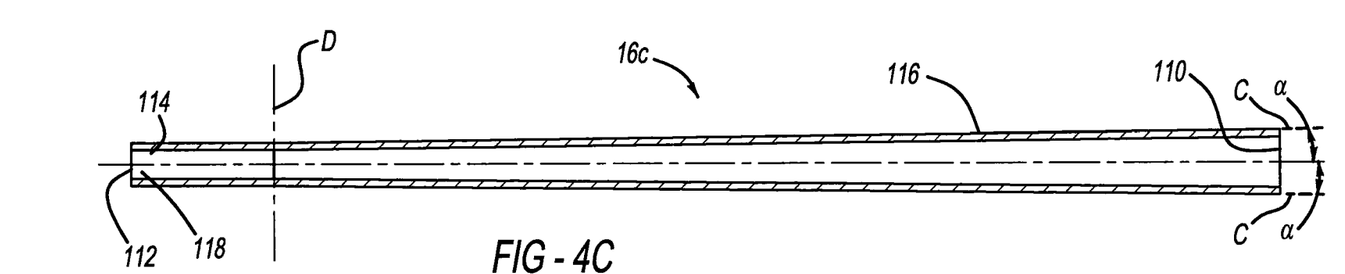
FIG. 4C is a cross-sectional view taken along line 4C-4C of FIG. 4A.

With additional reference to FIGS. 4A-4C, the elongated shaft 16c is illustrated. The elongated shaft 16c includes numerous features in common with the elongated shafts 16a and 16b, and thus the similar features are referenced with like reference numerals in the figures, and the descriptions of these like features set forth above also apply to the elongated shaft 16c. The outer surface 116 of the elongated shaft 16c is tapered inward towards the longitudinal axis A between the proximal end 110 and line D proximate to the distal end 112. Between line D and the distal end 112 the outer surface 116 is not tapered. Alternatively, the entire length of the outer surface 116 can be tapered.

The outer surface 116 can have a constant and continuous taper between the proximal end 110 and the line D, such that angle alpha ($\alpha$) measured between the outer surface 116 (lines C illustrated in FIG. 4A are extensions of the outer surface 116) and the longitudinal axis A is the same along the length of the elongated shaft 16c between line D and the proximal end. The outer surface 116 need not be tapered consistently, however. The outer surface 116 can be generally smooth along its entire length, or at any suitable portions or intervals thereof. The inner surface 114 may have a constant diameter as illustrated, or may be tapered inward towards the longitudinal axis A from the proximal end 110 to the distal end 112, or from the proximal end 110 to the line D. The elongated shaft 16c can have a maximum outer diameter at the proximal end 110 as measured perpendicular to the longitudinal axis A of about 4.5 millimeters, and an outer diameter as measured perpendicular to the longitudinal axis A at the distal end 112 of about 3.0 millimeters.

Figures 5A, 5B:
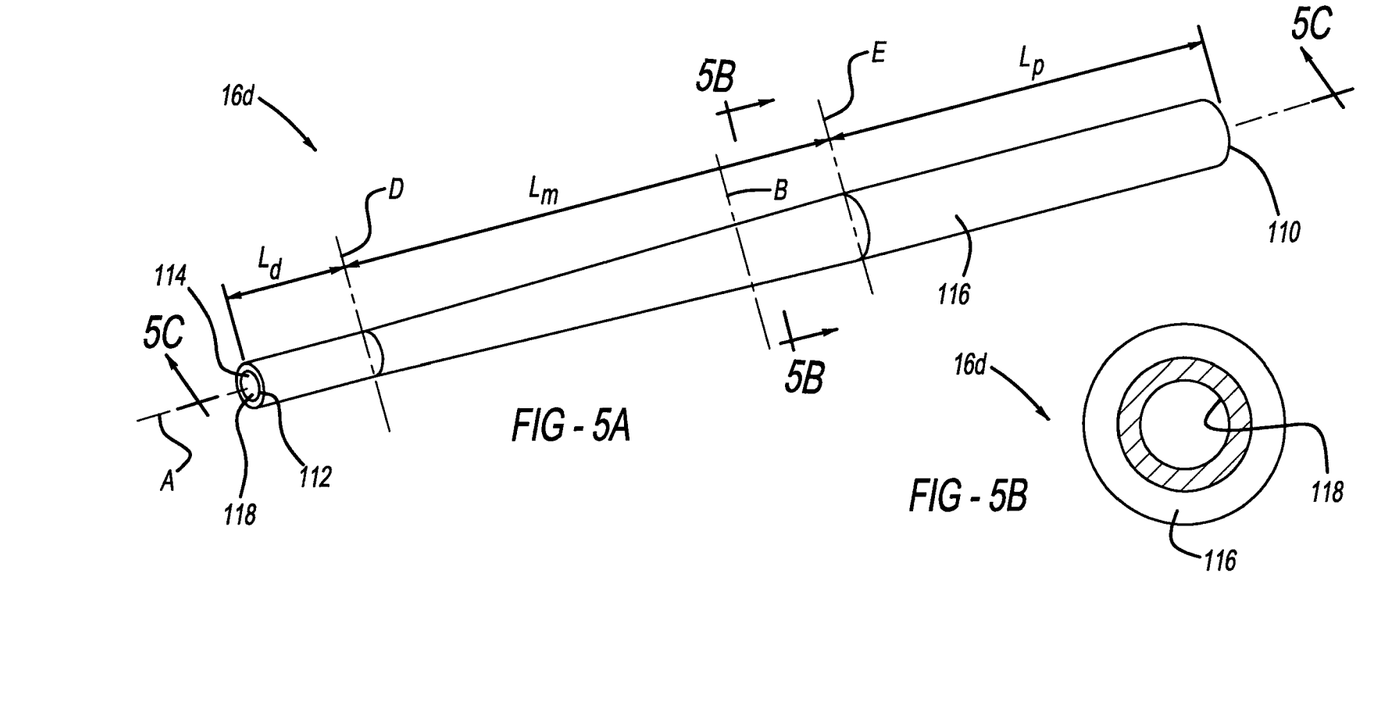
FIG. 5A is a perspective view of still another elongated shaft for use with the sensor assembly of FIG. 1.
FIG. 5B is a cross-sectional view taken along line 5B-5B of FIG. 5A.
Figure 5C:
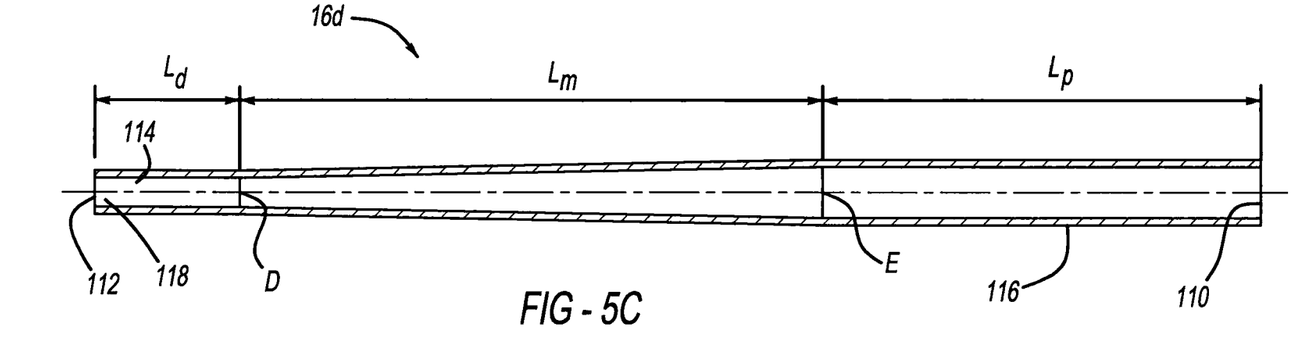
FIG. 5C is a cross-sectional view taken along line 5C-5C of FIG. 5A.

With reference to FIGS. 5A-5C, the elongated shaft 16d is illustrated. The elongated shaft 16d includes numerous features in common with the other elongated shafts 16a, 16b, 16c, and 16e, and thus the similar features are referenced with like reference numerals in the figures, and the descriptions of these like features also apply to the elongated shaft 16d. The elongated shaft 16d generally includes three sections, portions, or lengths: a proximal length Lp, a distal length Ld, and a mid-length Lm.

The proximal length Lp extends from the proximal end 110 to line E, which is between the mid-point B of the length of the elongated shaft 16d and the proximal end 110. The distal length Ld extends from the distal end 112 to line D. The mid-length extends between lines D and E, and across the mid-point B. The lengths Lp, Lm, and Ld can be any suitable length. Along the proximal length Lp, the maximum outer diameter of the elongated shaft 16d remains constant, such as at a maximum outer diameter of 4.5 mm or about 4.5 mm. Along the distal length, the maximum outer diameter of the elongated shaft 16d also remains constant, such as at a maximum outer diameter of 3.0 mm or about 3.0 mm. Along the mid-length Lm, the elongated shaft 16d is tapered inward towards the longitudinal axis A from the proximal end 110 to the distal end 112. The outer surface 116 thus tapers inward from a maximum outer diameter of 4.5 mm or about 4.5 mm at line E, to a maximum outer diameter of 3.0 mm or about 3.0 mm at line D. The outer surface 116 can taper at a constant rate along its length, or any suitable rate. The inner surface 114 can be tapered, or can have a constant maximum inner diameter along the entire length of the mid-length Lm.

Figure 6:
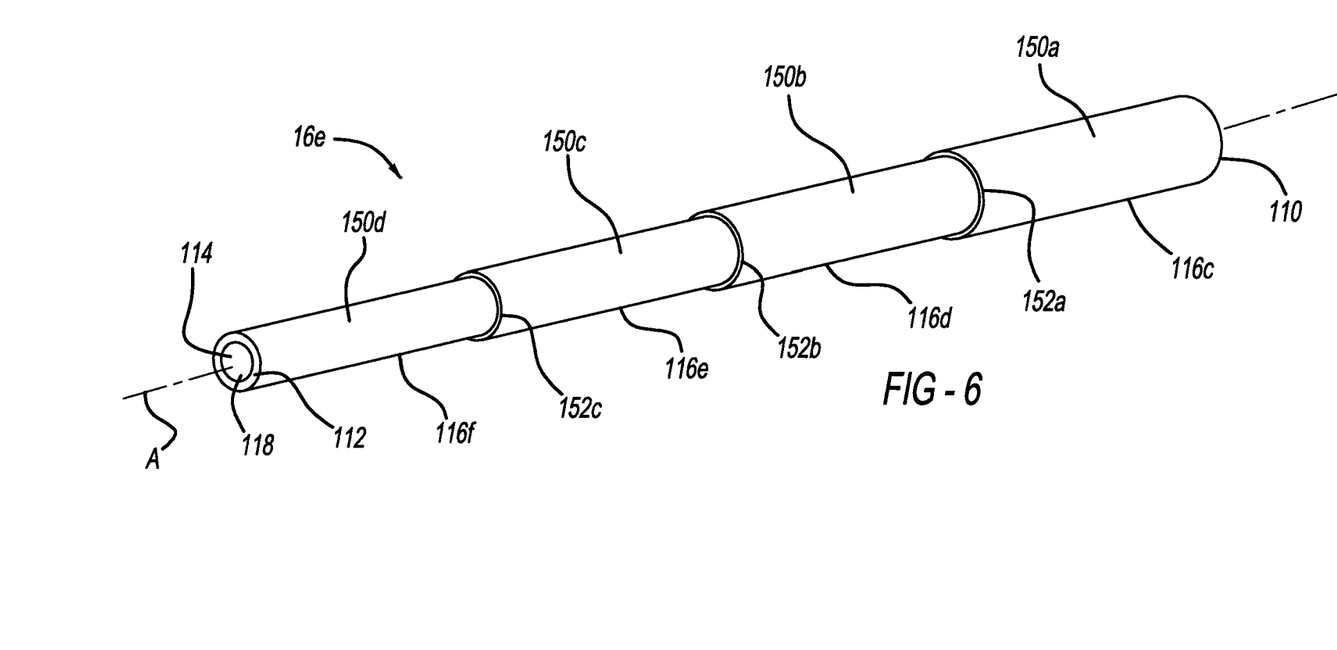
FIG. 6 is an additional elongated shaft for use with the sensor assembly of FIG. 1.

With reference to FIG. 6, the elongated shaft 16e is illustrated. The elongated shaft 16e includes a plurality of lengths, sections, or segments 150a-150d, each of which has a different maximum outer diameter at the outer surface 116. For example, a first segment or proximal segment 150a is at the proximal end 110. A second segment 150b is adjacent to the first segment 150a and extends from the first segment 150a towards the distal end 112. A third segment 150c is adjacent to the second segment 150b and extends from the second segment 150b towards the distal end 112. A fourth segment 150d is adjacent to the third segment 150c and extends from the third segment 150c to the distal end 112.

The first segment 150a includes an outer surface 116c. The second segment 150b includes an outer surface 116d. The third segment 150c includes outer surface 116e. The fourth segment 150d includes outer surface 116f. The outer surface 116c has the greatest outer diameter as compared to the outer surfaces 116d, 116e, and 116f. The outer surface 116d has an outer diameter that is smaller than that of the outer surface 116c, and greater than the outer diameter of each of the outer surfaces 116e and 116f. The outer surface 116e has an outer diameter that is smaller than that of each of the outer surfaces 116c and 116d, and greater than the outer diameter of the outer surface 116f. The outer surface 116f has the smallest outer diameter, which is smaller than the outer diameter of each of the outer surfaces 116c-116e.

Between each of the segments 150a-150d is a stepped portion where the outer diameter of the outer surface 116 changes. Specifically, a first step 152A is between the first segment 150a and the second segment 150b. A second step 152B is between the second segment 150b and the third segment 150c. A third step 152C is between the third segment 150c and the fourth segment 150d. Each of the first, second, third, and fourth segments 150a-150d have a uniform diameter along their lengths at their respective outer surfaces 116c-116f. Each of the first through fourth segments 150a-150d can have a similar length, such as 80 millimeters, or about 80 millimeters, or can have different lengths. Furthermore, some of the segments 150a-150d can have the same length, while others have different lengths. The segments 150a-150d can have any suitable length, such as 20 millimeters each, or about 20 millimeters each.

The outer diameter of each one of the first through fourth segments 150a-150d can each be of any suitable dimension. For example, the first segment 150a can have an outer diameter at the outer surface 116c of 4.5 millimeters, or about 4.5 millimeters. The second, third, and fourth segments 150b-150d can have progressively smaller outer diameters and can decrease at any suitable interval, such as 0.5 millimeters or about 0.5 millimeters. Therefore, the second segment 150b can have an outer diameter of 4.0 millimeters, or about 4.0 millimeters at outer surface 116d. The third segment 150c can have an outer diameter of 3.5 millimeters, or about 3.5 millimeters, at the outer surface 116e. The fourth segment 150d can have an outer diameter of 3.0 millimeters, or about 3.0 millimeters, at the outer surface 116f. Although four segments 150a-150d are illustrated, any suitable number of segments 150 can be provided, such as only two, only three, only four, only five, only six, only seven, or only eight, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A sensor assembly including a sensing element, a conductor connected to the sensing element, and an elongated shaft comprising:
   a proximal end;
   a distal end;
   an inner surface defining a through-bore extending from the proximal end to the distal end, the through-bore configured to receive the conductor therethrough; and
   an outer surface with a proximal diameter at the proximal end and a distal diameter at the distal end, the proximal diameter is greater than the distal diameter and configured to dampen vibration;
   wherein:
      the conductor extends out from within the elongated shaft and beyond the distal end of the elongated shaft; and
      the sensing element is supported by the conductor such that the sensing element is spaced apart from, and opposite to, the distal end of the elongated shaft and not covered by the elongated shaft.

2. The sensor assembly of claim 1, wherein the proximal diameter is a maximum outer proximal diameter, and the distal diameter is a maximum outer distal diameter.

3. The sensor assembly of claim 1, wherein the elongated shaft is tapered inward from the proximal end to the distal end.

4. The sensor assembly of claim 1, wherein the elongated shaft is tapered inward consistently from the proximal end to the distal end.

5. The sensor assembly of claim 1, wherein the outer surface includes a proximal length extending from the proximal end, a distal length extending from the distal end, and a mid-length extending between the proximal length and the distal length;
   wherein the outer surface has a constant diameter along both the distal length and the proximal length; and
   wherein the outer surface is tapered along the mid-length.

6. The sensor assembly of claim 1, wherein the outer surface has a constant diameter along a first length thereof extending from the distal end; and
   wherein the outer surface is tapered along a second length that extends from the first length to the proximal end.

7. The sensor assembly of claim 1, wherein the outer surface defines a plurality of segments each having a different maximum outer diameter.

8. The sensor assembly of claim 7, wherein a proximal segment of the plurality of segments is at the proximal end and a distal segment of the plurality of segments is at the distal end, the proximal segment has a larger outer diameter than the distal segment.

9. The sensor assembly of claim 7, wherein the outer surface defines a stepped portion between the plurality of segments.

10. The sensor assembly of claim 7, wherein the plurality of segments includes a first segment at the proximal end, a second segment distal to and adjacent to the first segment, a third segment distal to and adjacent to the second segment, and a fourth segment distal to and adjacent to the third segment, the fourth segment is at the distal end;
    wherein the first segment includes a first outer diameter, the second segment includes a second outer diameter, the third segment includes a third outer diameter, and the fourth segment includes a fourth outer diameter; and
    wherein the first outer diameter is greater than each of the second, third, and fourth outer diameters, and the fourth outer diameter is smaller than each of the first, second, and third outer diameters.

11. The sensor assembly of claim 7, wherein the outer surface defines a stepped portion between each one of the plurality of segments.

12. The sensor assembly of claim 7, wherein the outer surface of each one of the plurality of segments has a constant outer diameter along a length thereof.

13. The sensor assembly of claim 1, wherein the outer surface includes a proximal length extending from the proximal end, a distal length extending from the distal end, and a mid-length extending between the proximal length and the distal length;
    wherein the outer surface has a constant diameter along both the distal length and the proximal length; and
    wherein the outer surface is tapered along the mid-length.

14. The sensor assembly of claim 1, wherein the outer surface has a constant diameter along a first length thereof extending from the distal end; and
    wherein the outer surface is tapered along a second length that extends from the first length to the proximal end.

15. A sensor assembly including a sensing element, a conductor connected to the sensing element, and an elongated shaft comprising:
    a proximal end;
    a distal end;
    an inner surface defining a through-bore extending from the proximal end to the distal end, the through-bore configured to receive the conductor therethrough; and
    an outer surface with a proximal diameter at the proximal end and a distal diameter at the distal end, the proximal diameter is greater than the distal diameter and configured to dampen vibration;
    wherein:
       the sensing element is configured to sense properties of a gas;
       the conductor extends out from within the elongated shaft and beyond the distal end of the elongated shaft; and
       the sensing element is supported by the conductor such that the sensing element is spaced apart from, and opposite to, the distal end of the elongated shaft and not covered by the elongated shaft.

16. The sensor assembly of claim 15, wherein the outer surface defines a plurality of segments each having a different outer diameter dimension.

17. A sensor assembly comprising:
    a temperature sensing element including an exhaust gas temperature sensing thermistor;
    a conductor; and
    an elongated shaft including:
       a proximal end;

a distal end;

an inner surface defining a through-bore extending from the proximal end to the distal end, the through-bore configured to receive the conductor therethrough; and an outer surface with a proximal diameter at the proximal end and a distal diameter at the distal end, the outer surface tapers inward along a length thereof between the proximal end and the distal end, the proximal diameter is greater than the distal diameter to dampen vibration;

wherein:

the conductor extends out from within the elongated shaft and beyond the distal end of the elongated shaft; and the thermistor is supported by the conductor such that the thermistor is spaced apart from, and opposite to, the distal end of the elongated shaft and not covered by the elongated shaft.

18. The sensor assembly of claim 17, wherein the outer surface defines a plurality of segments each having a different outer diameter dimension.

19. The sensor assembly of claim 17, wherein the outer surface includes a proximal length extending from the proximal end, a distal length extending from the distal end, and a mid-length extending between the proximal length and the distal length;

wherein the outer surface has a constant diameter along both the distal length and the proximal length; and wherein the outer surface is tapered along the mid-length.

20. The sensor assembly of claim 17, wherein the outer surface has a constant diameter along a first length thereof extending from the distal end; and wherein the outer surface is tapered along a second length that extends from the first length to the proximal end.

* * * * *